US009728822B2

(12) United States Patent
Taga (10) Patent No.: US 9,728,822 B2
(45) Date of Patent: Aug. 8, 2017

(54) BATTERY CHARGER WITH A FAN (71) Applicant: MAKITA CORPORATION, Anjo-shi, Aichi (JP)

(72) Inventor: Hideyuki Taga, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 54 days.

(21) Appl. No.: 14/626,095

(22) Filed: Feb. 19, 2015

(65) Prior Publication Data
US 2015/0244034 A1  Aug. 27, 2015

(30) Foreign Application Priority Data

Feb. 26, 2014 (JP) ................. 2014-035711

(51) Int. Cl.
*H02J 7/00* (2006.01)
*H02J 7/14* (2006.01)
*H01M 10/613* (2014.01)
*H01M 10/42* (2006.01)
*H01M 10/46* (2006.01)
*H01M 10/6563* (2014.01)

(52) U.S. Cl.
CPC ....... *H01M 10/5004* (2013.01); *H01M 10/42* (2013.01); *H01M 10/46* (2013.01); *H01M 10/613* (2015.04); *H01M 10/6563* (2015.04); *H02J 7/0042* (2013.01); *H02J 7/0045* (2013.01)

(58) Field of Classification Search
USPC ....... 320/107, 103, 109, 113, 150, 162, 108, 320/116
See application file for complete search history.

(56) References Cited

U.S. PATENT DOCUMENTS

| 6,411,063 | B1 * | 6/2002 | Kouzu | ................. | B60L 3/0046 320/150 |
| 8,963,497 | B2 * | 2/2015 | Yang | ..................... | A01D 69/02 320/113 |
| 2004/0189260 | A1 * | 9/2004 | Kimoto | ............ | H01M 10/4207 320/150 |
| 2013/0033223 | A1 * | 2/2013 | Liu | ...................... | H02J 7/0013 320/107 |
| 2013/0265002 | A1 * | 10/2013 | Sakai | ..................... | H02J 7/022 320/107 |
| 2014/0091754 | A1 * | 4/2014 | Shum | ................... | H02J 7/0057 320/107 |

(Continued)

FOREIGN PATENT DOCUMENTS

| JP | 2001-095171 A | 4/2001 |
| JP | 2005-285608 A | 10/2005 |

(Continued)

OTHER PUBLICATIONS

Apr. 25, 2017 Office Action issued in Japanese Patent Application No. 2014-035711.

*Primary Examiner* — Alexis Pacheco
(74) *Attorney, Agent, or Firm* — Oliff PLC (57) ABSTRACT

A charger has a housing with a receptacle configured to receive a battery, an electrical circuit board, a fan to circulate air within the housing and to cool the battery, and a fan-supporting member to support the fan. The fan is located above the electrical circuit board. A part of the fan-supporting member is positioned between the fan and the electrical circuit board.

9 Claims, 10 Drawing Sheets (56) References Cited

U.S. PATENT DOCUMENTS

2014/0340025 A1\* 11/2014 Rief ..................... H02J 7/0044
320/107

FOREIGN PATENT DOCUMENTS

| | | |
|---|---|---|
| JP | 2006-047773 A | 2/2006 |
| JP | 2013-012068 A | 1/2013 |
| JP | 2013-031245 A | 2/2013 |
| JP | 2013-099119 A | 5/2013 |
| JP | 2013-192282 A | 9/2013 |

\* cited by examiner

BATTERY CHARGER WITH A FAN

This application claims priority to Japanese patent application Serial Number 2014-35711, filed on Feb. 26, 2014, the disclosure of which is incorporated herein by reference in its entirety.

BACKGROUND

Field

The present invention generally relates to a charger with a fan in a housing of the charger. More specifically, embodiments disclosed herein relate to a charger with a fan positioned near an opening in a housing of the charger such that the fan may intake air from outside the charger and distribute the air to cool a battery attached to the charger.

Background Art

A battery, known in the art as a type of electrochemical cell configured to store and supply electric current, may be heated while being charged. Further, discharge of the battery and/or otherwise supplying electric current from the battery may also result in heating of the battery. Thus, cooling of the battery may enhance overall battery operation and efficiency. Accordingly, various types of commercially available batteries, battery chargers and/or other related devices employ cooling fans to cool batteries to enhance overall battery efficiency. For example, Japanese Laid-Open Patent Application No. 2013-192282 discloses a battery charger with a fan positioned to cool a battery when charged. In detail, the fan disclosed by Japanese Laid-Open Patent Application No. 2013-192282 receives air taken from an intake port formed in a side of a housing of the battery charger to circulate the air toward the battery-attaching portion of the charger. Accordingly, the location of the fan and the configuration and/or placement of the battery within the battery charger housing allows for the fan to effectively direct air toward the battery to cool the battery. As a result, battery temperature may be regulated to effectively and/or timely charge the battery. However, the intake port in the housing of the battery charger may allow water, debris and/or other undesirable substances to enter into the housing and potentially disrupt the functioning of electronic componentry, such as a circuit board, mounted within the housing of the battery charger. Thus, protecting the circuit board by, for example, mounting it at a distance apart from the intake may be desirable to ensure regular and reliable battery charger functioning.

However, mounting the circuit board a distance apart from the intake port, as described above, may require a relatively larger and/or longer housing of the battery charger. As a result, the amount of room needed to install and/or place the battery charger on a work site may also increase proportionately. Such a larger and/or longer charger may be undesirable for an operator who may want to, for example, quickly move from one area to another.

In view of the above, a need exists in the art for a compact and transportable battery charger with an integrated battery cooling capability to ensure regular battery charging operation.

SUMMARY

The present invention generally relates to a battery charger with a housing configured to receive one or more batteries. The housing may include an electric circuit board, a fan, and a fan-supporting member. The fan may be positioned above the electric circuit board inside the housing to direct cooling air toward the batteries to regulate battery temperature during battery charging. The fan-supporting member may be placed between the fan and the electrical circuit board.

An overall installation area needed by the battery charger may be minimized according to the configuration described above. Further, the fan-supporting member may support the fan to prevent the fan from directly contacting the electric circuit board.

In an embodiment, the battery charger may have a guidepath positioned in the fan-supporting member to guide water entering into the housing through the intake port to below the electric circuit board. Accordingly, the guidepath may prevent water entering from at least part of the opening from dispersing and/or spilling onto the electric circuit board to, for example, disrupt operation of the battery charger.

The configuration described above may limit the exposure of electronic componentry associated with the circuit board to water entering from the inlet port. Moreover, since the guidepath for directing water away from the circuit board may be integrated with the fan-supporting member, the number of overall components needed to assemble and operate the battery charger may be minimized.

In an embodiment, a partition wall may extend from a base and/or a bottom part of the housing in a generally upward direction to separate the housing into sections. The guidepath may lead water, debris and/or other substances entering through at least part of the opening to a section with an orifice directed to discharge the water outside the housing.

By the configuration described above, water potentially entering into the housing of the battery charger through the inlet port may be easily discharged without contacting electronic componentry inside the housing.

In an embodiment, the fan-supporting member may be positioned to support a terminal-supporting member that is located at least partially outside of the housing. The terminal-supporting member may insert into the housing through a terminal opening. Water entering into the housing from the terminal opening may be discharged from a hole (orifice) used to intake air into the housing.

In the above-described configuration, the fan-supporting member may be positioned to support the terminal-supporting member in addition to the fan. Accordingly, the total number of components needed to assemble and/or operate the battery charger may be minimized. Moreover, the relatively simplicity of the above-described configuration allows for the air intake and water discharge through a single hole (orifice), rather then employing separate holes (orifices) dedicated to air intake and water discharge.

In an embodiment, a lower end of the guidepath may be positioned beneath an upper end of the partition wall. The partition wall may extend from the bottom part of the housing in the upward direction.

By the above-described configuration, water may be led as desired to a predetermined section.

In an embodiment, a discharge hole (orifice) configured to release water from the guidepath and/or housing may be positioned toward a bottom part of the housing.

By the above-described configuration, water may be prevented from accumulating in the housing.

In accordance with one or more of the above-described embodiments, the floor space occupied by the battery charger may be minimized.

DETAILED DESCRIPTION

Each of the additional features and teachings disclosed above and below may be used separately or in conjunction with other features and teachings to provide an improved battery charger. Representative examples of the present teaching, which examples use many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

Figure 1:
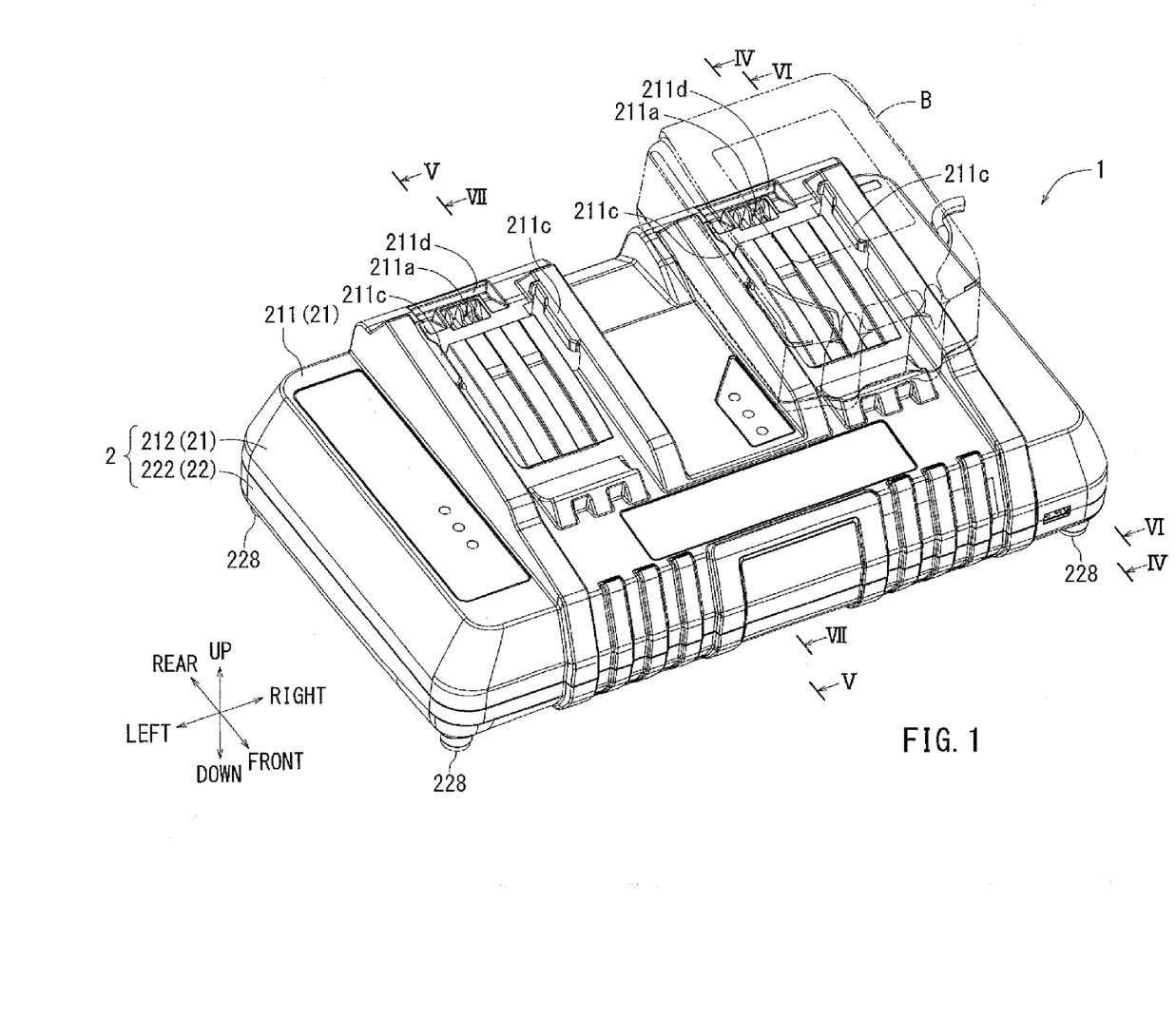
FIG. 1 illustrates an overall perspective view of a charger in accordance with an embodiment of the present invention.
Figure 2:
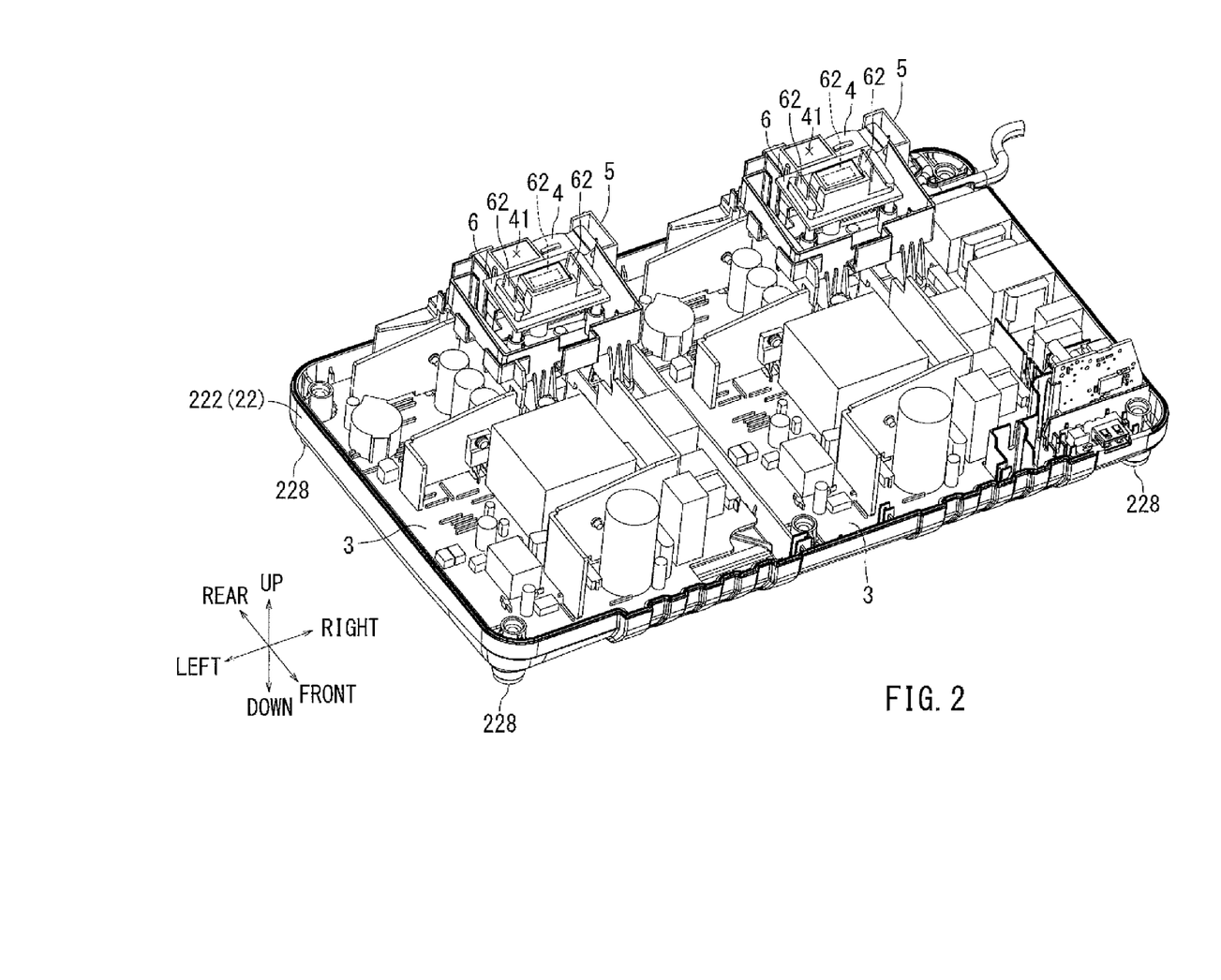
FIG. 2 illustrates a perspective view of a charger from which an upper housing thereof is removed in accordance with an embodiment of the present invention.
Figure 3:
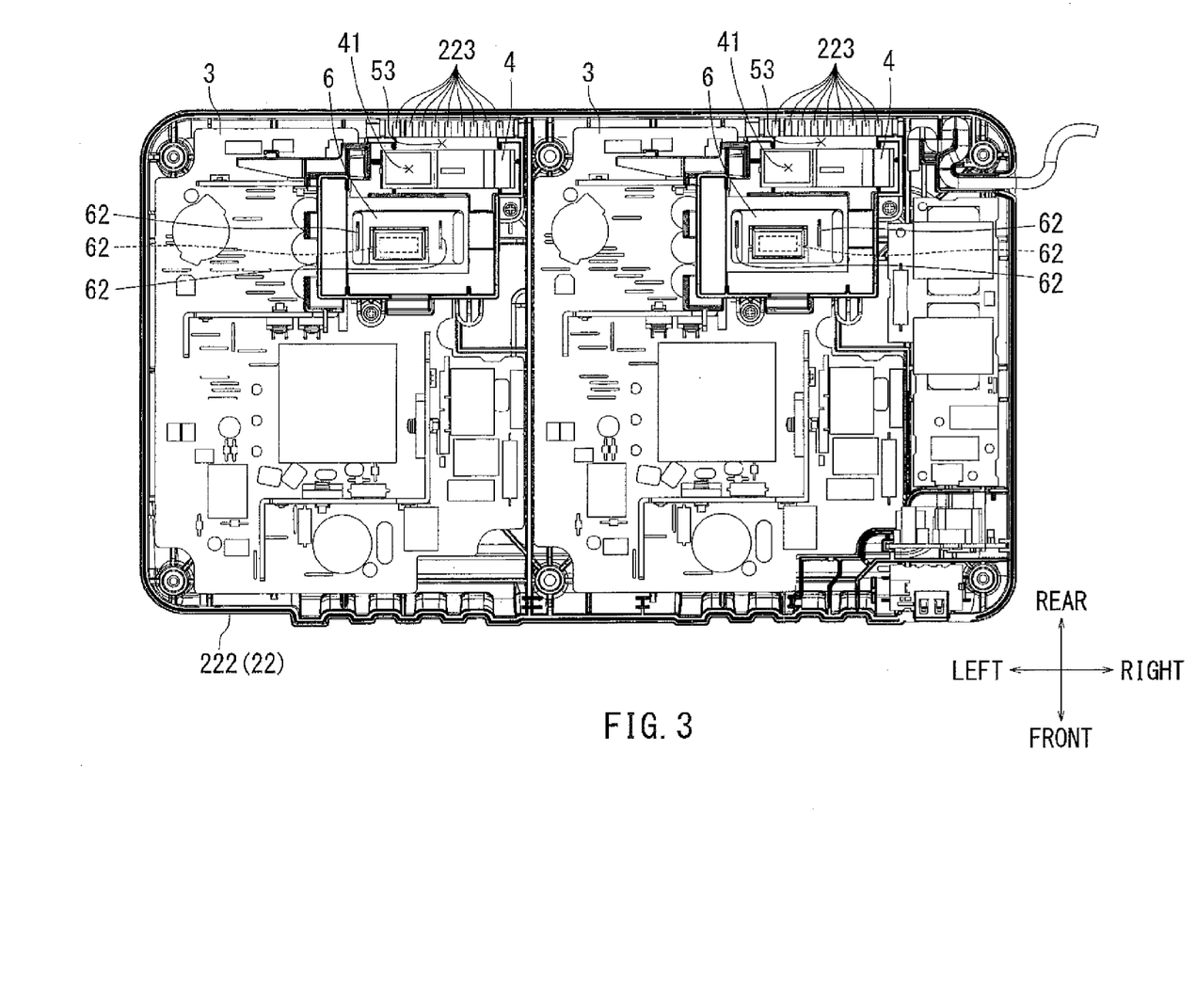
FIG. 3 illustrates a plan view of a charger from which an upper housing thereof is removed in accordance with an embodiment of the present invention.
Figure 4:
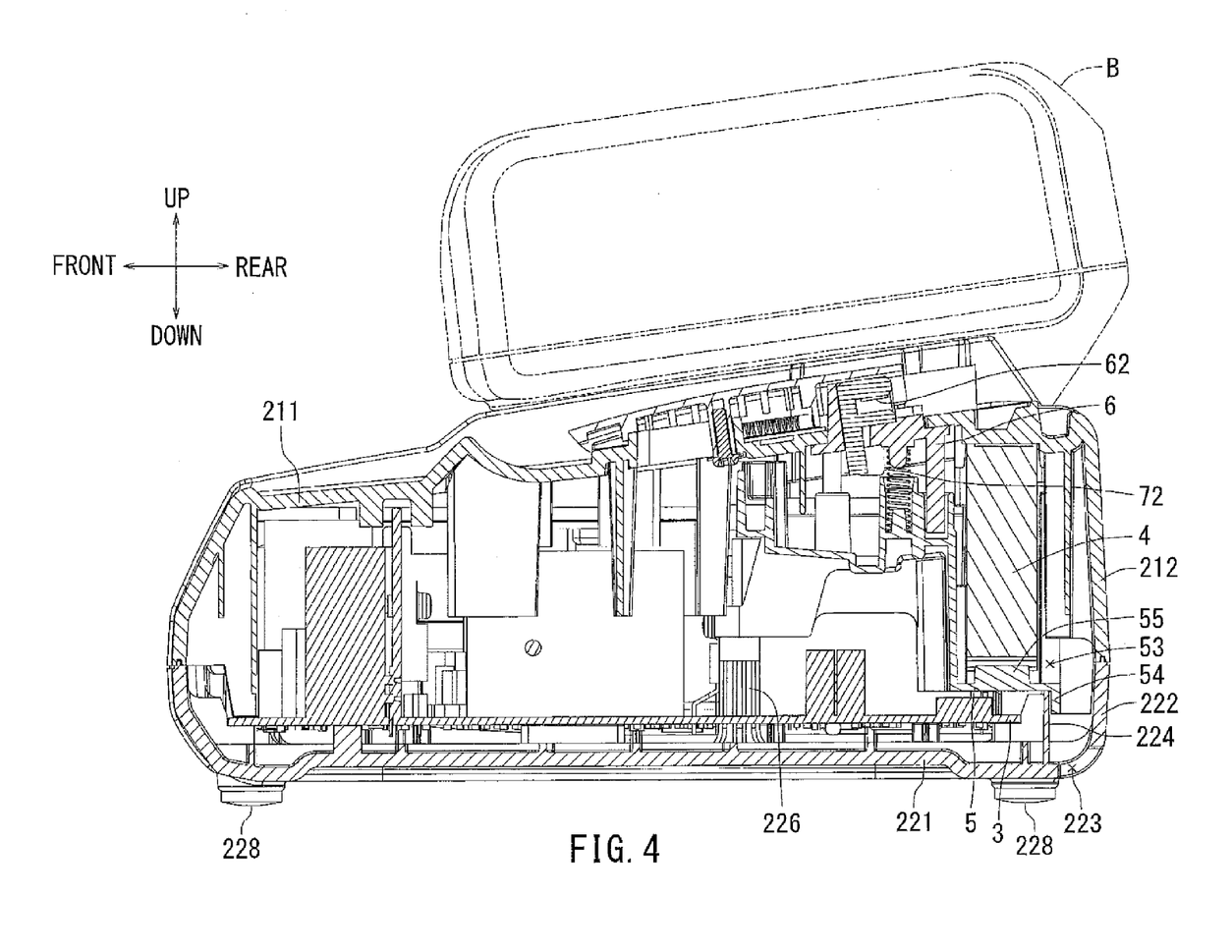
FIG. 4 illustrates a cross-sectional view taken from IV-IV of FIG. 1 in accordance with an embodiment of the present invention in accordance with an embodiment of the present invention.
Figure 5:
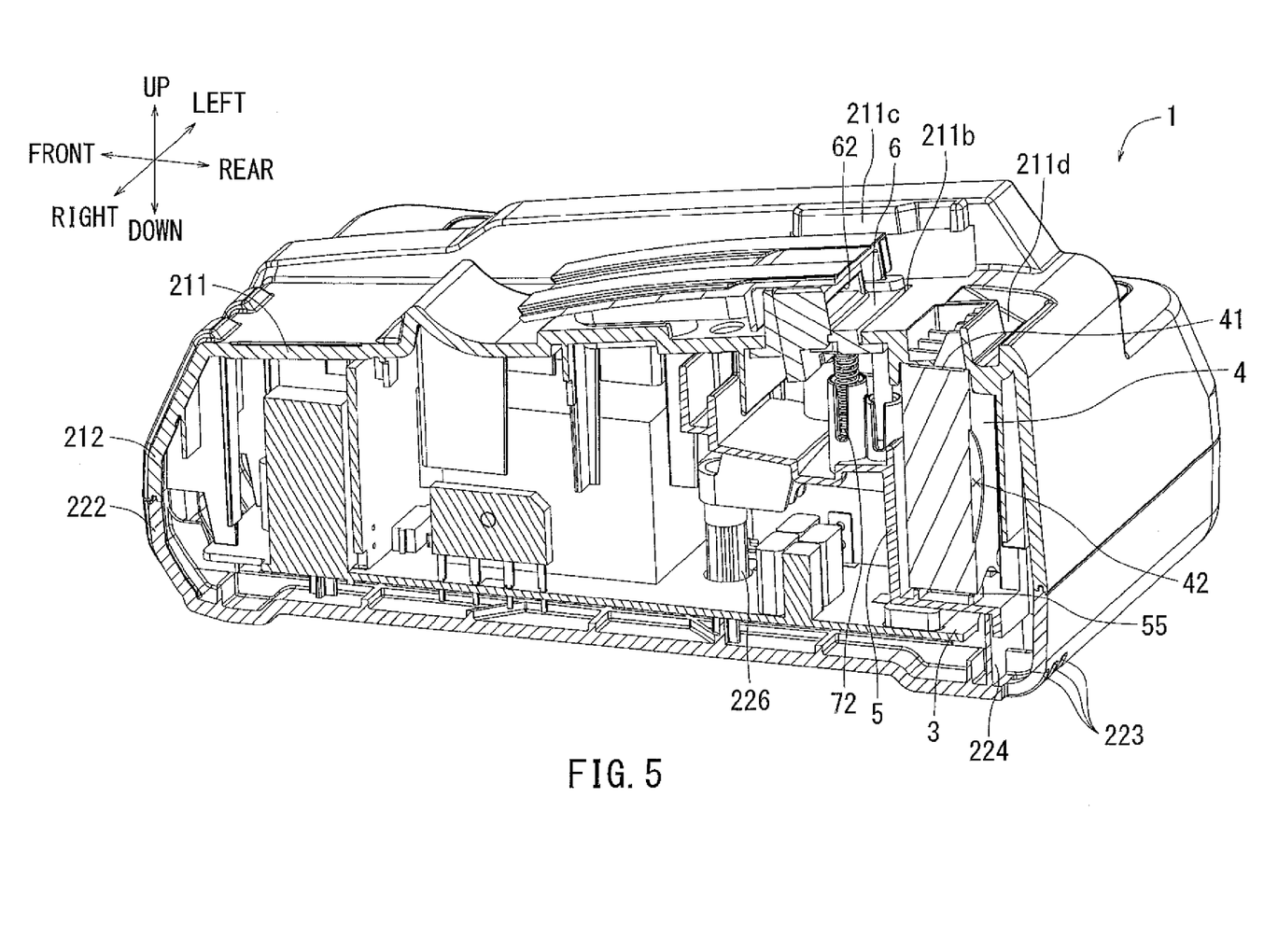
FIG. 5 illustrates a perspective cross-sectional view taken from V-V of FIG. 1. in accordance with an embodiment of the present invention

Referring now to FIGS. 1-10, an embodiment will be explained in further detail below. Initially, a brief explanation of a charger 1 will be described. Terms used to described position and/or orientation in the description below, such as a front, a rear, a left, and a right may be as shown in FIG. 1. The charger 1 of the present embodiment may be used to charge a battery 13 that may be used in, for example, an electric power tool. Referring to FIGS. 2 and 3, the charger 1 may include a housing 2, an electrical circuit board 3, a fan 4, and a fan-supporting member 5 that may hold and/or support the fan 4. Connecting terminals 62 for connecting the charger 1 with the battery B may protrude from the housing 2 to emerge on the outer side of the housing 2. Further, as shown in, for example, FIG. 10, terminals Ba may be positioned on the battery B, and the contacting terminals 62 of the charger 1 may connect with the terminals Ba of the battery B. Thus, the charger 1 may charge the battery B by this connection to the contacting terminals 62. The electrical circuit board 3 may be located inside the housing 2 and generally extend horizontally. As shown in FIGS. 2 and 3, various electronic components may be mounted on and/or attached with the electrical circuit board 3 such that electrical circuit may charge the battery B via an AC plug (not shown in the FIGS.). A fan-supporting member 5 may be used to position the fan 4 above the electrical circuit board 3, and as shown in FIGS. 4 and 5. Further, at least a part of the fan-supporting member 5 may be located between the fan 4 and the electrical circuit board 3. The charger 1 may be configured to accept and/or receive battery B by a sliding movement of the battery B along an upper housing of the charger 1 as shown in FIG. 1. For example, as shown by the two-dot line in FIGS. 1, 4, and 6, the attached battery B may be inserted into a corresponding slotted region on the charger 1. When attached, the connecting terminals 62 of the charger 1 and the terminals Ba of the battery B remain in a connecting state. The charger 1 of the present embodiment may be configured to accommodate and charge two batteries B attached to the charger 1.

A ventilation opening 211a may be positioned on the housing 2 to allow airflow circulated by the fan 4 to contact and cool the battery B. The ventilation opening 211a may primarily function a ventilation passage through which circulated air inside the housing 2 may escape to outside of the housing 2. In detail, the ventilation opening 211a may be positioned to allow air circulated within and discharged from the housing 2 to surround, contact and/or cool the battery B when attached to a cover part 211 of the housing 2. The ventilation opening 211a of the present embodiment may be formed on a cover part 211 of the housing 2, which may be an upper side of the housing 2. Air flowing from the ventilation opening 211a on the cover part 211 may flow from, for example, a generally lower side to an upper side of the charger 1 to cool the battery B.

Next, the housing 2 of the charger 1 will be described in further detail below. The housing 2 of the present embodiment may be separated into an upper part and a lower part. In detail, the housing 2 may have an upper housing 21 and a lower housing 22. The lower housing 22 may have a bottom part 221 that extends roughly in a horizontal direction and a lower wall part 222 that extends upwardly from a periphery of the bottom part 221. Thus, the lower housing 22 may be generally formed in a bottomed tubular shape with rounded edges. As shown in, for example, FIG. 1, the upper housing 21 may combine with the lower housing 22 to form the housing 2 shaped generally as a hollow container. The upper housing 21 may include an upper wall part 212, which may be formed in a tubular shape and have rounded sides and/or corners, and may be inserted into and/or joined with the lower wall part 222. The upper housing 21 may have the cover part 211 positioned in the upward direction, as shown in FIG. 1, and, for example, integrally formed the upper wall part 212. The cover part 211 may function as a base upon which a terminal opening 211b may be formed. Further, the lower wall part 222 and the upper wall part 212 may, when combined, for example, generally form a sidewall of the housing 2.

Figure 10:
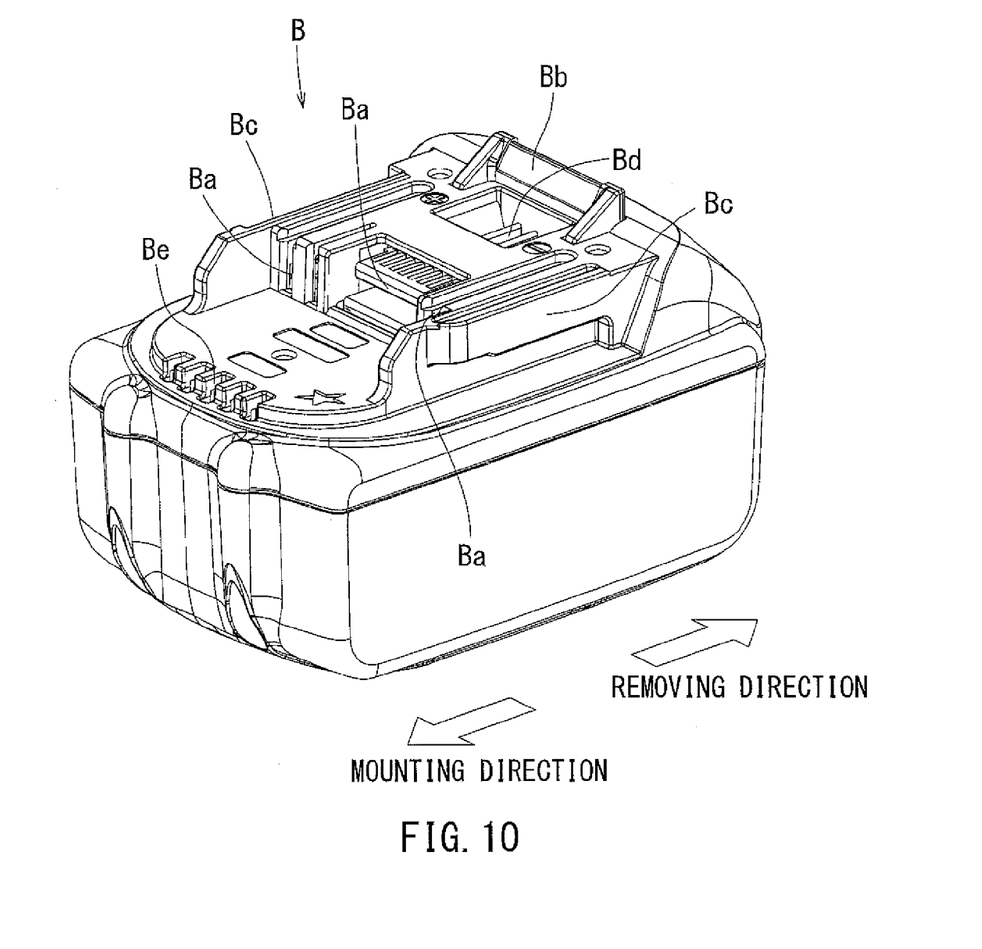
FIG. 10 illustrates a perspective view of a charger in accordance with an embodiment of the present invention.

In detail, the terminal opening 211b may be positioned and/or configured to open to at least a part of a terminal supporting member 6, as shown in FIG. 2, with connection terminals 62. Thus, as shown in FIGS. 1 and 2, a part of the terminal supporting member may protrude from the housing 2 when the upper housing 21 is joined and/or combined with the lower housing 22. Further, the fan-supporting member 5 may surround, connect with and/or support the terminal supporting member 6. Also shown in, for example FIG. 7, the ventilation opening 211*a* may be positioned adjacent to the terminal opening 211*b*. Further, as shown in FIG. 10, an air introduction opening Bd may be positioned on an underside of the battery B to communicate with the ventilation opening 211*a*. For example, air flowing through the ventilation opening 211*a* may enter into the air introduction opening Bd and exit through a cooling air discharge opening Be when the battery B is attached to the charger 1 to cool the battery B.

As shown in, for example, FIGS. 1, 5 and/or 7, a rail part 211*c* and/or an engaging groove 211*d*, recessed into the housing 2, may guide the battery B to connect with the charger 1. For example, the rail parts 211*c* may be formed in a protruding shape to interlock with corresponding surfaces, such as slide rails Bc, on the battery B to allow the battery B to slide into and/or connect with the charger 1. Further, the battery B may be held in position as desired for charging by inserting an engaging claw Bd of the battery B into the engaging groove 211*d* on the charger 1. As shown in FIG. 10, the engaging claw Bd may be positioned perpendicular to the sliding direction of the battery B. The engaging groove 211*d* may define three sides to generally form an inverted "U" shape, for example, around the ventilation opening 211*a*. Such a configuration may allow for air discharged from the ventilation opening 211*a* to flow uninterrupted into the battery B while the engaging claw Bd is engaged with the engaging groove 211*d*.

Figure 6:
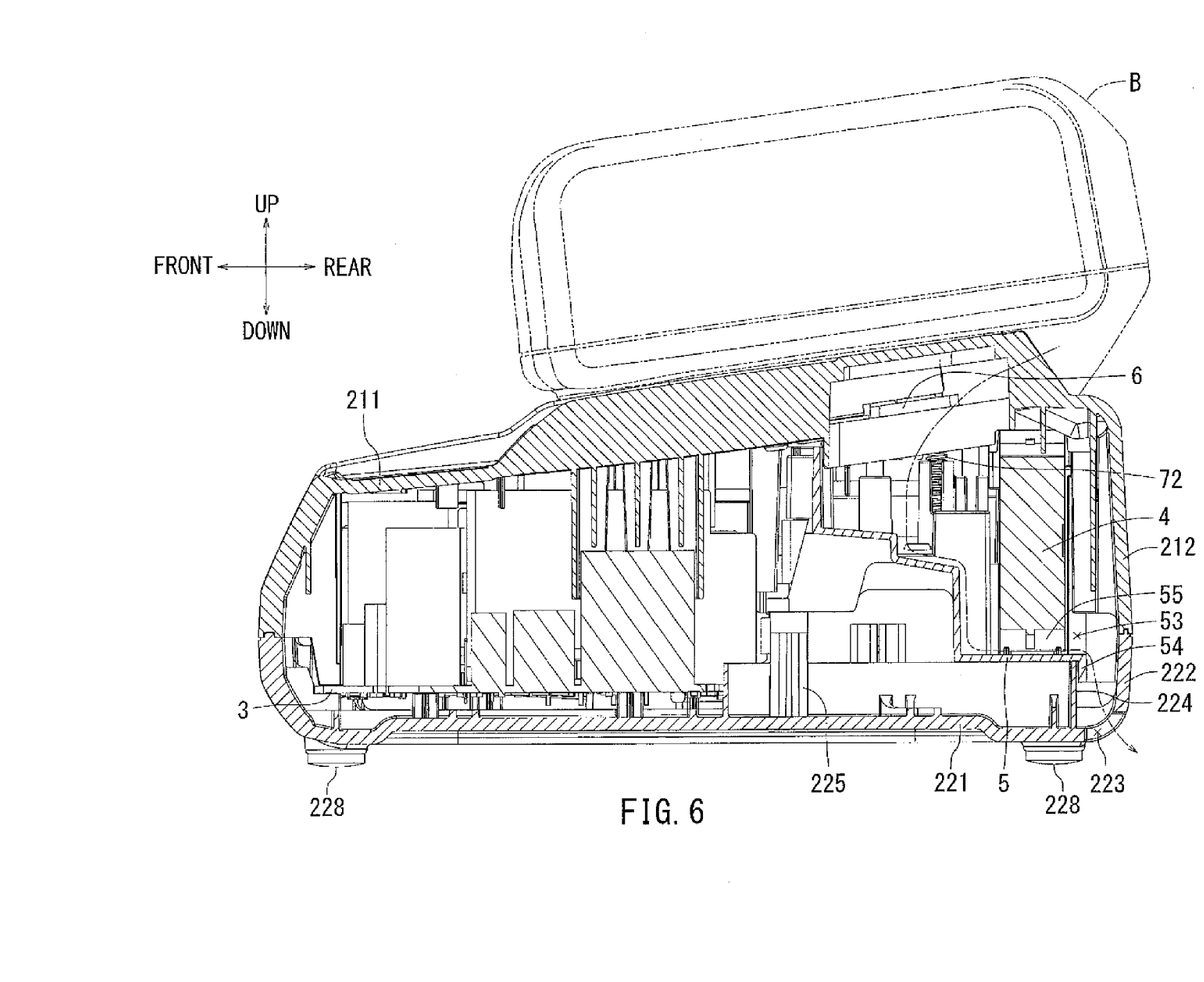
FIG. 6 illustrates a cross-sectional view taken from VI-VI of FIG. 1 in accordance with an embodiment of the present invention.
Figure 7:
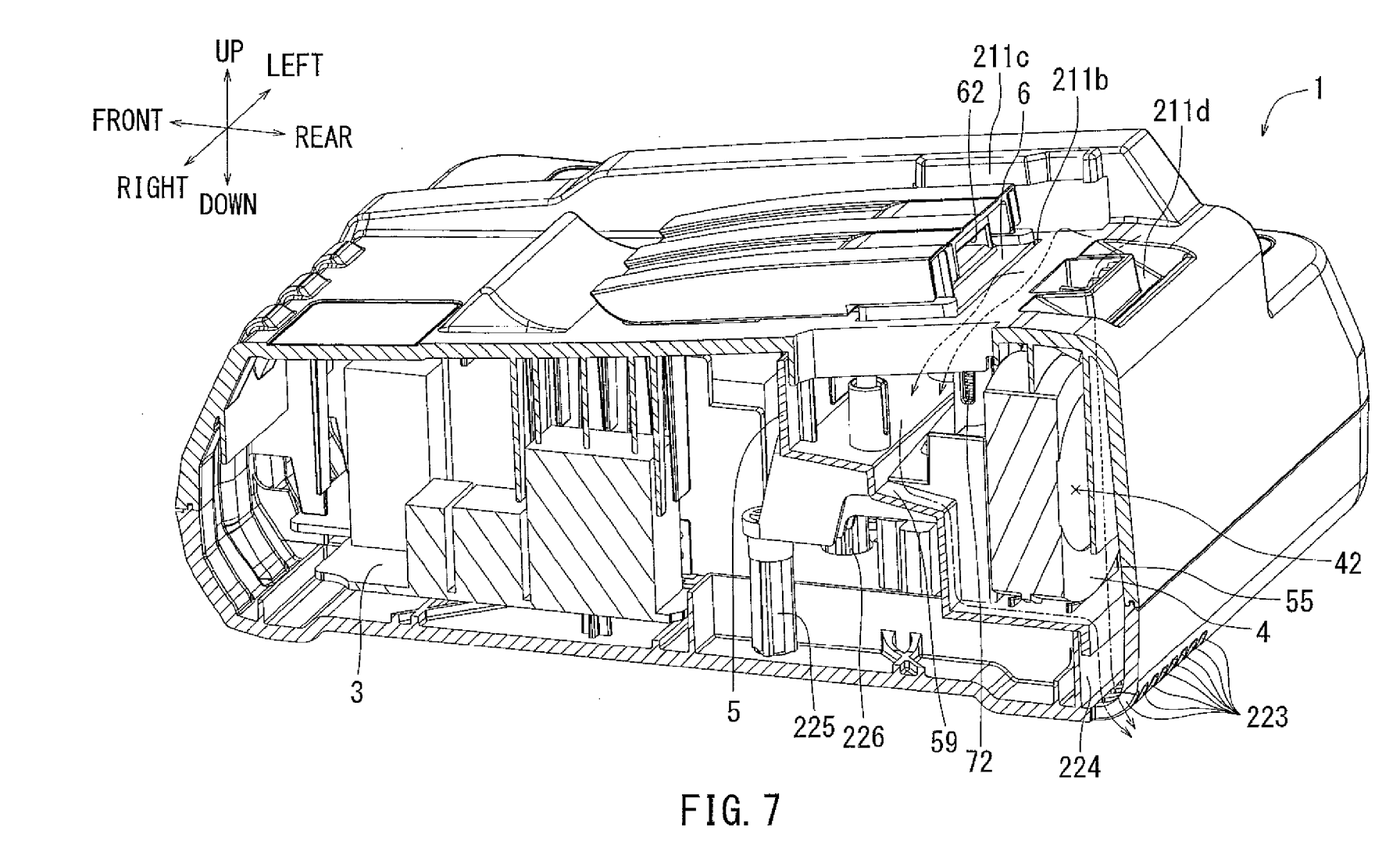
FIG. 7 illustrates a perspective cross-sectional view taken from VII-VII of FIG. 1 in accordance with an embodiment of the present invention.

As shown in, for example, FIGS. 3 through 7, the fan 4 used to cool the battery B may be positioned under the ventilation opening 211*a* of the cover part 211. Further, the fan 4 may be generally shaped as a column, as shown in FIGS. 2 and 7, for example, to position a circular-arc portion of the fan 4 in a vertical direction. As shown in FIG. 2, an exhaust opening 41 may be positioned close to an upper part of the fan 4. Further, as shown in FIG. 7, an intake opening 42 may be positioned on one side of the fan 4. Further, as shown in FIGS. 1 and 2, the exhaust opening 41 may be positioned to face and communicate with the ventilation opening 211*a* of the housing 2. Thus, the fan 4 may circulate air through the exhaust opening 41 and/or the ventilation opening 211 to outside the housing 2 to contact and/or cool the battery B.

As shown in, for example, FIG. 7, the fan 4 used for cooling the battery B may rest upon and/or be supported by a fan-supporting member 5. The fan-supporting member 5 may be configured to position the fan 4 above the electrical circuit board 3. Further, part of the fan-supporting member 5 may be located between the fan 4 and the electrical circuit board 3. The fan-supporting member 5 may be positioned beneath the fan 4 and be fixed to the lower housing 22. Also, the fan-supporting member 5 may have a guidepath 59. The guidepath 59 may direct water flowing into and/or through the fan-supporting member 5 to flow in a generally downward direction to a predetermined area other than the fan-supporting member 5. Thus, the guidepath 59 may prevent water and/or other undesirable substances from accumulating near the electrical circuit board 3, where, for example, water may interfere with regular functioning of components associated with the electrical circuit board 3.

The fan-supporting member 5 may be positioned beneath the ventilation opening 211*a* and the terminal opening 211*b*. As a result, the fan-supporting member 5 may receive and/or accumulate water entering from the ventilation opening 211*a* and the terminal opening 211*b*. The guidepath 59 of the fan-supporting 5 may be inclined as shown generally by a slope 511 that may direct water to flow into and be gathered in a drainage area 53. Water flowing into and/or collected within the drainage area 53 may be directed to a predetermined area of the housing 2.

Figure 8:
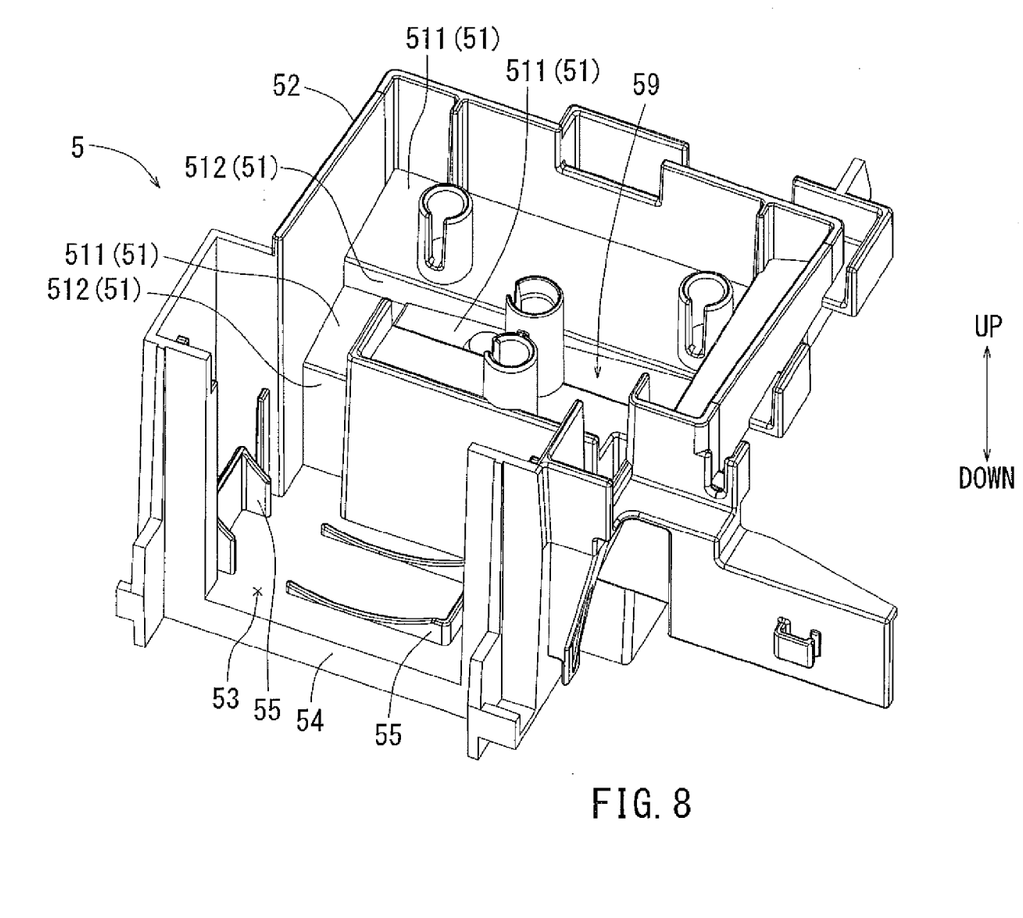
FIG. 8 illustrates a perspective view of a fan-supporting member viewed from the above in accordance with an embodiment of the present invention.

As shown in FIG. 8, the fan-supporting member 5 may have a base part 51 and a wall 52 positioned perpendicular and attached to the base part 51. The configuration of the wall 52 relative to the base part 51 may guide water, and/or other substances, that may enter into the fan-supporting member 5. Thus, the wall 52 (hereinafter termed water-overflow-prevention wall 52) may extend in the upward direction from peripheral edges of the base part 51 to generally prevent the overflow of water. The base part 51 may have one or more inclined surfaces 511 positioned as shown in FIG. 8. Connection surfaces 512 may be positioned perpendicular to and connect with the inclined surfaces 511 to generally form a "step" and/or "stair-case" type configuration. Further, a discharge part 53 for releasing water from the fan-supporting member 5 may be attached to a space and/or a gap in the water-overflow-prevention wall 52 where water may flow in a generally downward direction from a lower end of the gap. That is, the fan-supporting member 5 may be configured to allow water to flow and/or descend, via the various "steps" defined by the connection surfaces 512 and/or the inclined surfaces 511, generally toward the gap to exist the fan-supporting member 5. As shown in FIG. 5, the gap in the water-overflow-prevention wall 52 may be located adjacent to the intake opening 42 to, for example, allow water and/or other substances to escape the housing 2. Regardless, air may enter into the housing 2 through the intake opening 42 to be circulated by the fan 4 to cool the battery B and/or the electric circuit board 3.

As shown in, for example, in FIGS. 5 and 7, the fan-supporting member 5 may be adjacent to a side of the housing 2. Further, an upper portion of the water-overflow-prevention wall 52 may extend to, for example, join the cover part 211 and/or side surfaces of the fan-supporting member 5. Thus, by this configuration, air circulated by the fan 4 may pass through an area that may be partitioned by the side of the housing 2 and the water-overflow-prevention wall 52 of the fan-supporting member 5. Thus, generally according to the configuration described above, the water-overflow-prevention wall 52 may prevent air warmed by, for example, various electrical components on the circuit board 3 from reaching and/or heating the battery B.

One or more fan-supporting legs 55 may be positioned as shown in FIGS. 7 and 8 and may extend from the base part 51 of the fan-supporting member 5 to support the fan 4. Further, water may flow through and/or around the various fan-supporting legs 55 to exit the housing 2 through the guidepath 59.

Water exiting the drainage area 53 of the fan-supporting member 5 may gather in a predetermined area, with holes (orifices) 223, of the lower housing 22 as shown in FIG. 7. A partition wall 224 formed in, for example, a plate-like shape may extend from the bottom part 221 in the lower housing 22 as shown in FIGS. 4 and 5. The partition wall 224 may extend in the right-left direction where the left and right ends of the partition wall 224 may link to the lower wall part 222 (not shown in FIGS.). Thus, in the above configuration, water flowing from one side of the housing to another must pass through and/or go across the partition wall 224. As a result, the lower housing 22 may be effectively separated from, for example, other areas of the housing, by the partition wall 224.

In the present embodiments, the partition wall 224 may partition the lower housing 22 into, for example, two separate sections. Further, an upper end of partition wall 224 may be positioned above the electrical circuit board 3. As shown in FIGS. 5 and 7, the partition wall 224 may separate the lower housing into two sections, with the electrical circuit board 3 housed in one section and a plurality of slit-like holes (orifices) 223 located between the bottom part 221 and the lower wall part 212 in the other section. The positioning of the holes (orifices) 223 in the lower part of the housing may allow for both air intake into the housing 2 as well as water discharge through the fan-supporting member 5 to outside the housing 2. As shown in FIG. 4, four legs 228 may attach to the bottom part 221 of the housing to, for example, prevent the bottom part 221 from directly contacting another surface such as a table and/or the ground. Also, the raised position of the housing 2 relative to the surface upon which the housing 2 sits may allow for water to efficiently discharge from the holes (orifices) 223 out of the housing 2. Moreover, the partition wall 224 may block dust, debris and/or other particular matter from entering the housing 2 to, for example, potentially interfere with the functioning of the electric circuit board 3 as associated with the charging of battery B.

Figure 9:
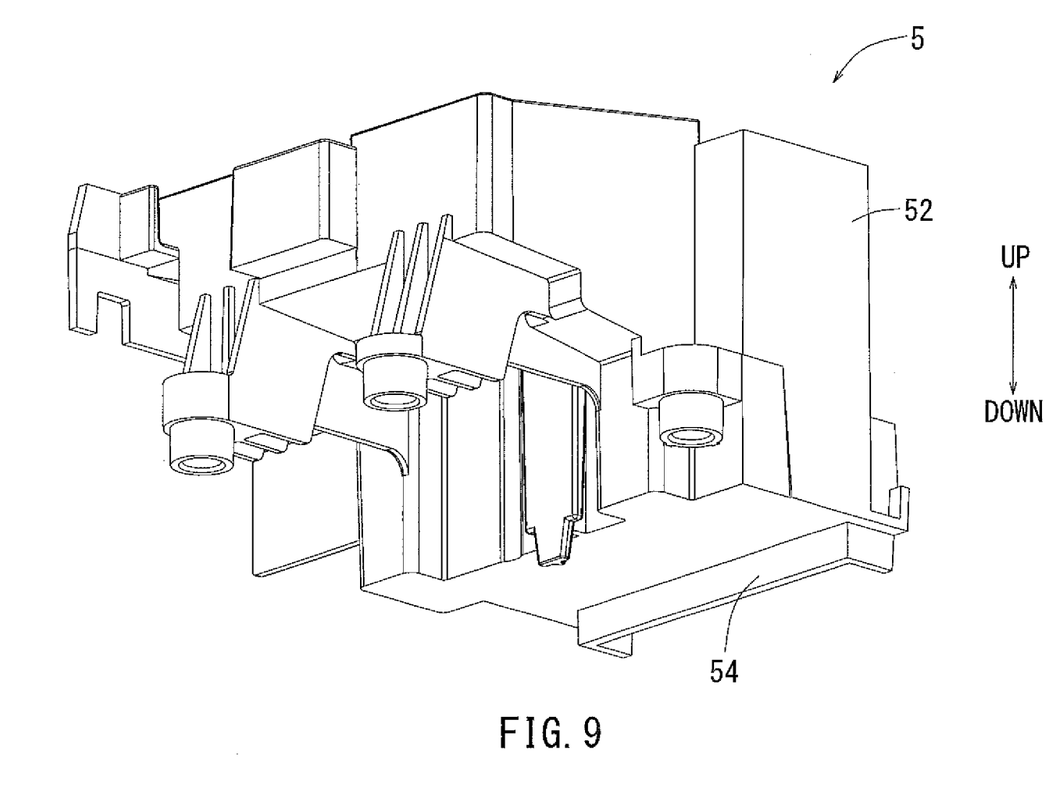
FIG. 9 illustrates a perspective view of a fan-supporting member viewed from the bottom in accordance with an embodiment of the present invention.

As shown in, for example, FIGS. 5 and 7, a lower section of the fan-supporting member 5 may be positioned next to the partition wall 224 and configured to overlap with a part of the partition wall 224. By this configuration, water guided by the fan-supporting member 5 in the lower direction may be prevented from further flowing to an area without holes (orifices). As shown in FIGS. 8 and 9, a downwardly extended portion 54 extending in the vertical downward direction may be formed in the bottom part 51 of the fan-supporting member 5. Further, as shown in FIGS. 4-7, the downwardly extended portion 54 may be in an area separated by the partitioned wall 224 and where holes (orifices) are located. Also, the downwardly extended portion 54 may overlap with the partitioned wall 224 in the vertical direction. As shown in FIGS. 4 and 6, the downwardly extended portion 54 may be above the holes (orifices) 223. In this configuration, water may pass through the housing 2 as shown by dashed line arrows in FIGS. 6 and 7. In conclusion, water entered into the housing 2 may flow toward the hole (orifice) 223 to discharge outside the housing 2.

As shown in, for example, FIGS. 5 and 7, part of the fan-supporting member 5 may be placed on the partition wall 224. Further, referring to FIGS. 7 and 9, a first leg 225 may extend from the lower housing 22 in an upward direction to, for example, connect and/or be engaged with part of the fan-supporting member 5. A screw, for example, may fix a second leg 226 from the lower housing 22 to the fan-supporting member 5. In further detail, as shown in FIGS. 5 and 7, the second leg 226 may extend from the lower housing 22 in an upward direction such that the second leg 225 may contact and/or pass through the electric circuit board 3. Also, a screw may fix the fan-supporting member 5 to the lower housing 22 (not shown in the FIGS.).

Further, the fan-supporting member 5 may be positioned to connect with and/or support a terminal supporting member 6 with a connecting terminal 62 designed to connect with and/or receive the battery B. A spring 72 may be positioned between the fan-supporting member 5 and the terminal supporting member 6 to assist the terminal supporting member 6 to move in the vertical direction relative to the fan-supporting member 5. By the terminal supporting member 6 being moved in the up and down direction, dimensional errors in manufacturing for each product may be absorbed. The terminal supporting member 6 may be shifted in the vertical direction to, for example, account for potential irregularities in manufacturing the charger 1. Accordingly, potential malfunction due to an improper connection between the battery B and the connecting terminal 62 of the charger may be averted.

The charger 1, as discussed above, may have the electrical circuit board 3 placed above the bottom part 221 of the housing 2. The fan-supporting member 5 may be positioned between the electrical circuit board 3 and the fan 4 to support the fan 4 as shown in the FIGS. Further, at least a part of the fan-supporting member 5 may be located between the fan 4 and the electrical circuit board 3. Accordingly, the housing 2 of charger 1 may be relatively compact due to the vertical orientation and/or installation of the various listed components such as the electrical circuit board 3, the fan-supporting member 5, and/or the fan 4. As a result, the charger 1 may be easily transported from one work site to another and may also not require significant floor space. Also, given position of the fan-supporting member 5 within the housing 2 as discussed above, the fan 4 may rest upon the fan-supporting member 5 without contacting the electrical circuit board 3.

Also, and as discussed earlier, the fan-supporting member 5 may have a guidepath 59 designed to direct water flow to prevent water from contacting the electrical circuit board 3 to potentially disrupt charging of the batter B. Also, as shown in the FIGS., the guidepath 59 may be integrally formed with the fan-supporting member 5 to reduce an overall number of components required for the assembly and/or construction of the charger 1.

Moreover, as discussed above, the partitioning wall 224 may extend from the bottom part 221 of the housing 2 to, for example, divide and/or separate the housing of the charger 1 into sections. In detail, a section may have the guidepath 59 of the fan-supporting member 5 to direct water to outside the housing 2. Thus, water entering into the housing 2 may be discharged to outside of the housing 2 and may thus be prevented from accumulating in the housing 2.

Also, as discussed earlier, the terminal supporting member 6, resting on the fan-supporting member 5, may protrude from the housing 2. Also, and as shown in FIG. 5, the terminal supporting member 6 may insert into the terminal opening 211b. Air circulated by the fan 4 may escape from the housing 2 through the ventilation opening 211a. Water may enter, for example, either the terminal opening 211b and/or the ventilation opening 211a and may proceed to flow along the guidepath 59 of the fan-supporting member 5 to exit the housing 2 through the holes (orifices) 223. As discussed earlier, the holes (orifices) 223 may allow air to enter into the housing 2 and permit water to escape, thus minimizing a total number of holes (orifices) needed.

Further, the guidepath 59 may be positioned beneath an upper portion of the partition wall 224 that extends in an upward direction from the bottom part 221 of the housing 2. Accordingly, the guidepath 59 may overlap with the partition wall 224 to direct water entering from the outside of the housing 2 to a predetermined section.

Also, as shown in FIG. 7 and as discussed earlier, holes (orifices) 223 may be formed in the bottom part 211 of the housing 2 to discharge water as needed. Thus, outlet of water through the holes (orifices) 223 may prevent water from accumulating within the housing 2 to, for example, potentially disrupt charging the battery B.

Moreover, as shown in, for example, FIGS. 1 and 2, the charger 1 may be configured to receive, connect with and charge two batteries B. Further, the fan-supporting member 5 may support the fan 4 positioned generally beneath, for example, each battery B in the charger 1. Also, the ventilation opening 211a may be positioned adjacent to the exhaust opening 41 to efficiently cool each battery B without, for example, permitting air to escape in a direction other than through the ventilation opening 211a. Also, as discussed earlier and as shown in the FIGS., one fan-supporting member 5 may be positioned beneath each battery B, thus minimizing the overall size of the housing 2 of the charger 1.

Further, as discussed earlier, the exhaust opening 41 may be positioned adjacent to the ventilation opening 211a to direct cooling air circulated by the fan 4 toward the battery B. Thus, the fan 4 may direct air through the exhaust opening 41 and out of, for example, the ventilation opening 211a to efficiently cool the battery B. Also, the fan-supporting member 5 may be positioned within the housing 2 so as to not directly contact the electric circuit board 3 as shown in, for example, FIG. 7. Thus, although the fan 4 may vibrate during regular operation, such vibrations may be transferred to the fan-supporting member 5 alone, and not to the electric circuit board 3, for example. Accordingly, overall wear-and-tear on the electric circuit board 3 and/or the housing 2 during operation of the charger 1 may be minimized.

Further, as shown in FIG. 7, for example, the fan-supporting member 5 may not be linked and/or attached to the upper housing 21. Thus, the fan 4 may remain stationary even when the upper housing 21 is separated from the lower housing 22. Also, the stationary position of the fan 4 may allow for access as needed for regular maintenance of electrical wiring of the fan 4.

Further, as shown in FIGS. 6 and 7 and as discussed earlier, holes (orifices) 223 may be positioned between the bottom part 221 and the lower wall part 212 to intake and/or discharge air. Also, the fan 4 may be positioned near the drainage area 53 and fit into the housing 2 as needed. Also, as shown in FIGS. 6 and 8, the fan-supporting member 5 may be positioned a set distance apart from the electric circuit board 3 to create space for accommodating electronic componentry as needed.

The present invention is not limited to the above-described embodiments and may be further modified without departing from the scope and spirit of the present invention. For example, the charger may receive and/or connect with one battery, two batteries, three batteries or more. Further, the number of the fan-supporting members 5 may differ from the number of fans 4. For instance, one fan-supporting member may support two or more fans.

As shown in the present embodiment, the partition wall 224 may partition the housing 2 into two sections. However, the partition wall 224 may be repositioned and/or reconfigured to divide the housing 2 into, for example, three or more sections. Moreover, the partition wall 224 may be constructed and/or configured such that water flowing through, for example, the guidepath 59 of the fan-supporting member 5 may pass through and/or be discharged from one or more sections. In detail, the partition wall 224 may isolate at least one section from the electric circuit board 3 to protect the electric circuit board 3 and/or other associated electronic componentry from contacting water, for example.

Also, the partition wall 224 may generally define a lower part of the housing 2. Further, the partition wall 224 may be formed and/or configured in a generally circular shape, when viewed from above, where an orifice in the partition wall 224 may allow water and/or other substances to discharge to outside the housing 2.

Also, as generally shown in the FIGS., the fan 4 may be positioned to overlap with at least part of the electrical circuit board 3, when viewed from above. Further, the fan 4 may be positioned over only a part of the electrical circuit board 3 to achieve, for example, sufficient cooling of the battery B.

Moreover, as described above, holes (orifices) 223 may be positioned to receive water discharged from, for example, the guidepath 59 in the fan-supporting member 5. However, the holes (orifices) 223 may be repositioned in another area of the housing 2 as needed. For example, the holes (orifices) 223 may be repositioned to be located in one or more of the sections defined by the partition wall 224.

What is claimed is:

1. A charger comprising:
   a housing with a base wherein the housing has a receptacle configured to connect with a battery;
   an electrical circuit board mounted in the base;
   a fan-supporting member coupled to the housing;
   a partition wall that extends from the base of the housing in an upward direction along a side surface of the housing, wherein the partition wall divides the housing into sections; and
   a fan supported by the fan supporting member wherein the fan is configured to circulate air within the housing to cool the battery, and further wherein:
   the fan is positioned above the electrical circuit board; and
   at least part of the fan-supporting member is positioned between the fan and the electrical circuit board.

2. The charger of claim 1, further comprising:
   a guidepath formed in the fan supporting member wherein the guidepath is configured to direct water beneath the electrical circuit board.

3. The charger of claim 2, wherein:
   the guidepath directs water entered into the housing to a section with an orifice configured to discharge water to outside the housing.

4. The charger of claim 1, wherein:
   the fan-supporting member is coupled to a terminal supporting member wherein a portion of the terminal supporting member extends outside the housing.

5. The charger of claim 1, further comprising:
   an orifice in the housing wherein the orifice is configured to allow air and water to pass into and out of the housing.

6. The charger of claim 2, wherein the guidepath is positioned beneath the partition wall.

7. The charger of claim 6, wherein a lower end of the guidepath is positioned below an upper end of the partition wall.

8. The charger of claim 5, wherein at least a part of the orifice is located at a bottom portion of the housing.

9. The charger of claim 1, the at least part of the fan-supporting member is positioned between a lower part of the fan and an upper part of the electrical circuit board when viewed from a surface on which the charger is placed.

* * * * *